United States Patent [19]

Frimet

[11] 4,382,268

[45] May 3, 1983

[54] TAPE TRANSPORT SPEED CONTROL

[75] Inventor: Stanley H. Frimet, Englewood, Colo.

[73] Assignee: Honeywell Inc., Minneapolis, Minn.

[21] Appl. No.: 198,936

[22] Filed: Oct. 20, 1980

[51] Int. Cl.³ .......................................... G11B 15/46
[52] U.S. Cl. .................................................. 360/73
[58] Field of Search .................................... 360/73

[56] References Cited

U.S. PATENT DOCUMENTS 3,691,314  9/1972  De Bell et al. ................ 360/73
3,702,382 11/1972  Breikss ............................ 360/73
3,753,067  8/1973  Milligan ........................ 318/314

*Primary Examiner*—Robert S. Tupper

*Attorney, Agent, or Firm*—L. J. Marhoefer; Lockwood D. Burton; Mitchell J. Halista

[57] ABSTRACT

A tape transport speed control uses a speed controller supplied with packing density or digital bits per inch of recording medium and data rate or digital bits per second to compute the speed of the tape which would conform to these selected parameters by the speed being equal to the data rate divided by the packing density. The speed controller uses a combination of digital and analog circuits to produce a reference signal and a speed select signal for the tape transport speed control operation using a comparison between the reference signal and a tachometer signal to control the tape transport about the basic selected tape speed.

5 Claims, 2 Drawing Figures

TAPE TRANSPORT SPEED CONTROL

BACKGROUND OF THE INVENTION

1. Field of the Invention

The present invention relates to tape recorders. More specifically, the present invention is directed to a tape speed control for a tape recorder.

2. Description of the Prior Art

The prior art tape speed controllers for magnetic tape digital bit recorders have usually operated by allowing the operator to select a desired tape speed as shown in U.S. Pat. No. 3,702,382. The tape speed at which the transport operates is selected by a control signal generated by a manual control or an electrical interface with a control unit, e.g., a data processor, to select the speed level. Concurrently, a reference clock signal operating at a defined frequency is also selected. The tape speed is then determined by the speed controller to be proportional to the reference frequency within the selected speed level by comparing the reference signal frequency with a signal representative of the tape speed within the tape transport, e.g., a tape drive techometer signal as shown in U.S. Pat. No. 3,753,067. However, such a system does not afford a maximum utilization of the recording surface available on the magnetic tape inasmuch as the tape speed is unrelated to the desired or attainable bit packing density or the input rate of the digital bits to be recorded on the magnetic tape.

SUMMARY OF THE INVENTION

An object of the present invention is to provide an improved tape transport speed control for driving a magnetic recording tape to attain a desired recorded bit packing density.

In accomplishing this and other objects, there has been provided, in accordance with the present invention, a tape transport speed control utilizing means for providing a reference frequency signal to a speed controller by computing the speed to be maintained by the tape transport based on a desired recorded bit packing density and the rate of incoming data bits to be recorded.

BRIEF DESCRIPTION OF THE DRAWINGS

A better understanding of the present invention may be had when the following detailed description is read in connection with the accompanying drawings, in which.

DESCRIPTION OF THE PREFERRED EMBODIMENT

Detailed Description

Figure 1:
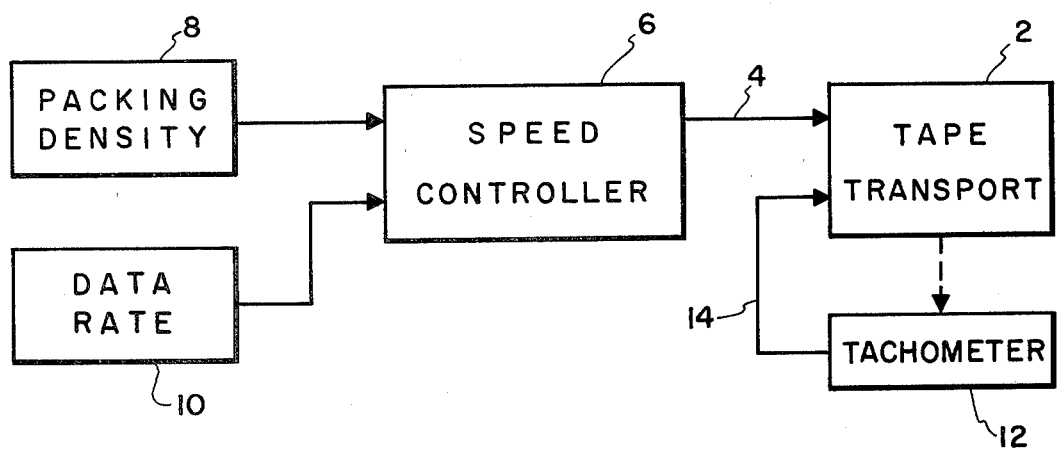
FIG. 1 is a block diagram of an example of a tape transport speed control embodying the present invention and FIG. 2 is a detailed blocked diagram of a speed controller suitable for use in the system shown in FIG. 1.

Referring to FIG. 1 in more detail, there is shown a block diagram of a speed control system for a tape transport 2. The tape transport 2 is supplied with a speed control signal over an input line 4 from a speed controller 6. The speed controller 6 is arranged to compute the speed control signal for the tape transport 2 in response to signals representative of the bit packing density 8 and input data rate 10 supplied to the speed controller 6. This relationship is defined by the speed controller output as being dependent on the frequency of the input data in bits per second divided by the packing density in bits per inch. The computation within the speed controller 6 can be performed by using analog computer techniques when the inputs and/or outputs are represented by voltages or shaft positions, by using digital computer techniques in performing the actual arithmetic operations on the input parameters when they are represented by or converted to digital numbers suitable for use in the digital computer or by using hybrid techniques which are based on the use of a combination of analog and digital operations to obtain the desired speed as shown in FIG. 2 and described hereinafter.

The tape transport 2 can be any suitable digital recorder whose speed is determined by the frequency of a clock signal which is compared with a signal representative of the tape speed, e.g., a signal from a techometer 12 applied over tach output line 14, such tape transport devices being well-known in the art. Such a tape transport would include a speed selection system where the desired tape speed is selected by a means of speed selection lines actuated either manually or electrically to control the tape speed based on the frequency of a reference clock. The reference clock in the latter case can have a limited dynamic range, e.g., if the tape recorder operates from a low speed of 15/16 inches per second to a high speed of 240 ips then the reference clock would normally have a dynamic range of 256:1. However, if speed selection lines are used with a 2 to 1 relationship, e.g., 240, 120, 60, etc. ips, than the reference clock frequency need only vary over a 2 to 1 range to cover the full spectrum of tape speeds. For example, if the 120 ips line is selected, than the speed range controlled by varying the reference clock would be 90 to 180 ips.

Figure 2:
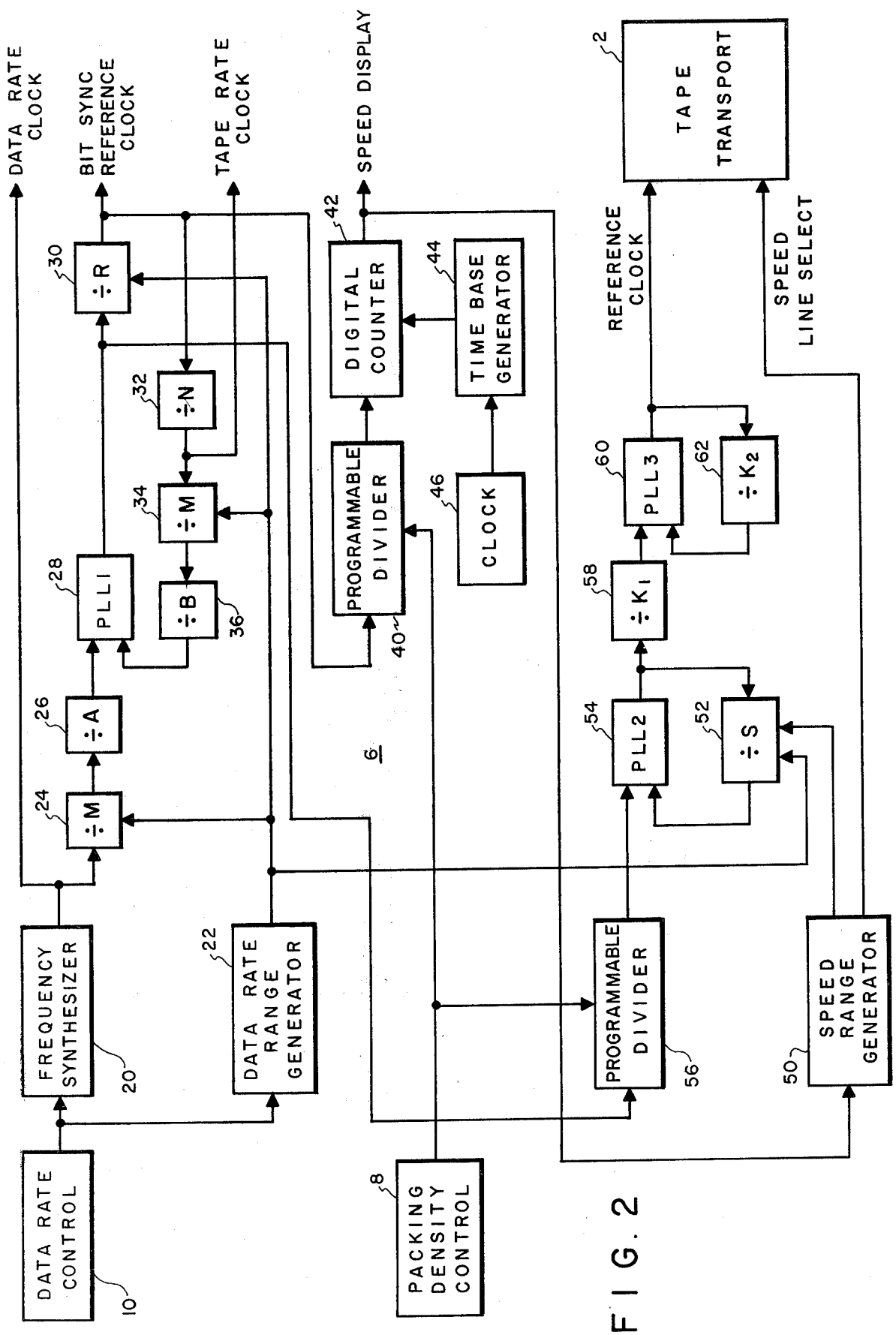

Referring to FIG. 2, in more detail, there is shown a block diagram of a system suitable for use as the speed controller 6 shown in FIG. 1. In this block diagram of FIG. 2, the packing density and data rate inputs 8, 10 are provided with similar reference numbers used for these elements in FIG. 1. The input parameters of "data rate" and "packing density" are selected by means of a so called "thumbwheel" type switches which generate the parameters as digital numbers. Alternatively, the input parameters can be supplied by means of a remote electrical interface between the speed control system and a digital processing apparatus, e.g., a microprocessor. The output of the system shown in FIG. 2 selects one of nine "speed selection lines" in addition to generating a reference clock whose frequency can vary over a two to one range to control the tape transport 2 at the desired speed. The digital code or word from the data rate control 10 is applied to a frequency synthesizer 20 to a data rate range generator 22. The frequency synthesizer 20 generates a clock signal at the frequency selected by the digital word from the data rate control 10. This clock signal is applied to a first programmable frequency divider ÷ M block 24. The output of the ÷ M block 24 is applied to a first fixed frequency divider ÷ A block 26. The output of the ÷ A block is supplied as reference frequency to a first phase lock loop 28. The output of the phase lock loop 28 is applied to a second programmable divider ÷ R block 30 to produce an output signal which is the bit synchronizing reference clock. The output of the ÷ R block is applied to a second fixed divider ÷ N block 32. The output of the ÷ N block 32 is applied to a second ÷ M block 34 and to an output line as a tape rate clock signal. The output of the second ÷ M block 34 is applied to a third fixed divider ÷ B block 36 which has its output connected to the phase lock loop 28. The output of the ÷ R block 30 is also applied as a control input to a third programmable frequency divider 40. The output of the frequency divider 40 is applied to a digital counter 42 which has applied thereto a control signal for defining a counting period from a time base generator 44 supplied with a clock signal from a clock 46. The output of the digital counter 42 is applied to a tape speed display (not shown) and to a speed range generator 50.

The data rate range generator 22 divides the full dynamic frequency range of the data rate control 10 into multiple range to control the various programmable frequency dividers used in the control system. This is necessary because of the limited dynamic range of the phase lock loops. For example, the output of the data rate range generator 22 is applied to the ÷ M frequency dividers 24 and 34 and ÷ R frequency divider 30 to control their frequency dividing operation. The output of the data rate range generator 22 is also applied to a fourth programmable divider ÷ S block 52. The ÷ S frequency divider 52 is connected in the feedback loop around a second phase lock loop circuit 54. The reference frequency input for the second phase lock loop 54 is obtained from a fifth programmable divider 56 which is controlled by the digital code or word from the packing density control 8 to divide the frequency output of the first phase lock loop 28. The output of the second programmable divider 56 is a frequency output proportional to tape speed. The fourth frequency divider 52 is controlled by both the speed and data rate ranges by having an output signal from the data rate range generator 22 and the output of the speed range generator 50 applied thereto. The output of the second phase lock loop 54 is also applied to a fourth fixed frequency divider ÷ $K_1$ block 58. The output of the divider 58 is applied to a third phase lock loop 60 having in its feedback loop a fifth fixed divider ÷ $K_2$ 62. The output of the third phase lock loop 60 is also applied as a reference clock signal to the tape transport 2. The output of the speed range generator 50 is also applied as a speed line select signal to the tape transport 2 to select the desired basic tape speed, e.g., 240, 120, 60, etc. ips.

The transfer function of a phase lock loop is the product of the frequency dividers in the feedback loop divided by the product of the frequency dividers in the reference path. Therefore, the frequency of the tape rate clock is:

$$(MB/MA) \times (f_1) = (B/A) \times (f_1)$$

where $f_1$ is the output of the synthesizer 20.

The ratio B/A is selected to accommodate any added data to allow overhead data to be inserted. The ÷ N block 32 multiplies the tape rate clock to the much higher bit synchronizing reference clock. The ÷ R block 30 under control of the data rate range generator 22 allows the output of the first phase lock loop 28 to remain within its operating dynamic range, nominally a two to one range. It also allows the bit synchronizing reference clock to cover the full range of the data rate. The tape speed is a function of the bit frequency of the tape recording and the packing density, i.e., the tape rate clock divided by the packing density. The bit synchronizing reference clock produced by the ÷ R block 30, which is proportional to the tape rate, feeds the programmable divider 40 whose frequency division is controlled by the selected packing density 8. This pulse train is counted by the digital counter 42 during a specific time interval as determined by the time base generator 44 to scale the result. The output of the counter 42 is a digital representation of the required tape speed. This speed number is applied to the speed range generator 50 which divides the speed into ranges in order to control the transport speed range.

The output of the first phase lock loop 28 is also divided by the second programmable divider 56 to make the output frequency thereof proportional to speed. This signal is multiplied by the ÷ S block 52 in the feedback loop of the second phase lock loop 54. The factor S is controlled by both the speed signal and data rate range signal from the speed range generator 50 and the data rate range generator 22, respectively. The third phase lock loop 60 scales the output of the second phase lock loop 54 by $K_2$ divided by $K_1$ so that the reference clock to the tape transport 2 is within the required range. Thus, the system allows the selected parameters of data rate and packing density to be converted to a tape speed display and to speed range and frequency signal for the tape transport 2 whereby the tape speed is selected and controlled in accordance therewith. In summary, the transport user selects the data rate (bits per second) of the data to be recorded and the desired packing density (bits per inch). The control system shown in FIG. 2 automatically provides the speed select and reference frequency signals to control the tape transport 2 to conform to the selected parameters. Additionally should the rate of the incoming data be varied, the tape speed would follow the reference clock to retain the desired packing density.

Accordingly, it may be seen that there has been provided, an improved tape transport speed control for controlling a tape speed in accordance with an incoming data rate and a data bit packing density.

The embodiments of the invention in which an exclusive property or privilege is claimed are defined as follows:

1. A recording tape speed control system comprising tape transport means for driving a recording tape in response to a tape speed selection signal representative of a selected tape speed and a reference frequency signal representative of a comparison standard at the selected tape speed,
   means for supplying a signal representative of a desired packing density of data recorded on said tape,
   means for supplying a signal representative of the rate of the data being received for recording on said tape,
   means for deriving said tape speed selection signal and said reference frequency signal for said tape transport means in response to the ratio of the desired packing density of data recorded on said tape to the rate of the data being received for recording.

2. A speed control system as set forth in claim 1 wherein said packing density and said rate of the data are supplied to said means for deriving as digital words.

3. A speed control system as set forth in claim 1 wherein tape transport means includes a tachometer means for producing a signal representative of tape speed which signal is compared to said reference frequency signal.

4. A method of controlling the tape speed in a tape transport including the steps of providing signals representative respectively of a desired recorded data packing density and the incoming rate of the data to be recorded, deriving a reference frequency signal based on the ratio of the desired data packing density to the incoming rate of the data and supplying the reference signal to a tape transport speed controller for comparison with a signal representative of tape speed.

5. A method as set forth in claim 4 and including the further steps of producing a basic tape speed selection signal from the ratio of the desired packing density and the incoming rate of the data and supplying the speed selection signal to the tape transport speed controller to select a tape speed for the packing density and the incoming rate of the data.

* * * * *